(12) United States Patent
Moore et al.

(10) Patent No.: US 7,560,166 B2
(45) Date of Patent: Jul. 14, 2009

(54) ADHESIVE ARTICLE, COMPOSITE ARTICLE, AND METHODS OF MAKING THE SAME

(75) Inventors: George G. I. Moore, Afton, MN (US); John C. Clark, White Bear Lake, MN (US); Audrey A. Sherman, St. Paul, MN (US); Mark W. Muggli, West St. Paul, MN (US); Kurt C. Melancon, White Bear Lake, MN (US); Timothy D. Filiatrault, Maplewood, MN (US); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 446 days.

(21) Appl. No.: 11/275,355

(22) Filed: Dec. 28, 2005

(65) Prior Publication Data

US 2007/0148473 A1 Jun. 28, 2007

(51) Int. Cl.
*B32B 25/20* (2006.01)
(52) U.S. Cl. .................. 428/447; 525/474; 528/28
(58) Field of Classification Search ............... 428/447; 525/474; 528/28
See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 3,890,269 A | 6/1975 | Martin | |
| 4,450,263 A | 5/1984 | West | |
| 4,661,577 A | 4/1987 | Jo Lane et al. | |
| 4,707,531 A | 11/1987 | Shirahata | |
| 4,774,310 A | 9/1988 | Butler | |
| 4,900,474 A | 2/1990 | Terae et al. | |
| 4,935,484 A | 6/1990 | Wolfgruber et al. | |
| 5,026,890 A | 6/1991 | Webb et al. | |
| 5,028,679 A | 7/1991 | Terae et al. | |
| 5,118,775 A | 6/1992 | Inomata et al. | |
| 5,214,119 A | 5/1993 | Leir et al. | |
| 5,236,997 A | 8/1993 | Fujiki | |
| 5,248,739 A | 9/1993 | Schmidt et al. | |
| 5,262,558 A | 11/1993 | Kobayashi et al. | |
| 5,276,122 A | 1/1994 | Aoki et al. | |
| 5,302,685 A | 4/1994 | Tsumura et al. | |
| 5,319,040 A | 6/1994 | Wengrovius et al. | |
| 5,446,118 A | 8/1995 | Shen et al. | |
| 5,461,134 A | 10/1995 | Leir et al. | |
| 5,475,124 A | 12/1995 | Mazurek et al. | |
| 5,482,991 A | 1/1996 | Kumar et al. | |
| 5,512,650 A | 4/1996 | Leir et al. | |
| 5,670,598 A | 9/1997 | Leir et al. | |
| 5,792,554 A | 8/1998 | Leir et al. | |
| 5,961,770 A | 10/1999 | Cifuentes et al. | |
| 6,326,072 B1 | 12/2001 | Ojeda et al. | |
| 6,407,195 B2 | 6/2002 | Sherman et al. | |
| 6,441,118 B2 | 8/2002 | Sherman et al. | |
| 6,531,620 B2 | 3/2003 | Brader et al. | |
| 6,548,612 B2 * | 4/2003 | Smith et al. | 526/255 |
| 6,569,521 B1 | 5/2003 | Sheridan et al. | |
| 6,664,359 B1 | 12/2003 | Kangas et al. | |
| 6,730,397 B2 | 5/2004 | Melancon et al. | |
| 6,750,277 B1 | 6/2004 | Yamana et al. | |
| 6,846,893 B1 | 1/2005 | Sherman et al. | |
| 6,878,440 B1 | 4/2005 | Yamanaka et al. | |
| 2002/0013442 A1 * | 1/2002 | Sherman et al. | 528/28 |
| 2003/0165676 A1 | 9/2003 | Zhou et al. | |
| 2003/0175510 A1 | 9/2003 | Sherman et al. | |
| 2005/0143541 A1 | 6/2005 | Caldwell et al. | |
| 2005/0143595 A1 | 6/2005 | Klun et al. | |

FOREIGN PATENT DOCUMENTS

| | | |
|---|---|---|
| JP | 2002-322363 | 11/2002 |
| JP | 2004-190013 | 7/2004 |
| JP | 2005-86283 | 3/2005 |
| WO | WO 95/03354 | 2/1995 |
| WO | WO 96/30426 | 10/1996 |
| WO | WO 96/34028 | 10/1996 |
| WO | WO 96/34029 | 10/1996 |
| WO | WO 96/35458 | 11/1996 |
| WO | WO 98/15602 | 4/1998 |
| WO | WO 99/14281 | 3/1999 |

OTHER PUBLICATIONS

Kaplan, "PSA's Tenaciously Bond to Non-Stick Film" Adhesives and Sealants Industry, Feb. 2001, pp. 40-42.
Scheirs, "Modern Fluoropolymers", John Wiley & Sons, Chichester, 1997, pp. 63-65, 165-172.
Tyagi et al., "Segmented organosiloxane copolymers: 2 Thermal and mechanical properties of siloxane-uera copolymers", Polymer, Dec. 1984, vol. 25, pp. 1807-1816.
Encyclopedia of Polymer Science and Engineering, vol. 15, John Wiley & Sons, Inc., Canada, 1989, pp. 265-270.
Qiu et al., "Fluoroactylate-Mercaptofunctional Copolymers", U.S. Appl. No. 11/027,605, filed Dec. 28, 2004.
Qiu et al., "Fluoroacrylate-Multifunctional Acrylate Copolymer Compositions", U.S. Appl. No. 11/027,612, filed Dec. 28, 2004.
Moore et al., "Water- And Oil-Repellent Fluorourethanes and Fluoroureas", U.S. Appl. No. 11/027,633, filed Dec. 28, 2005.

* cited by examiner

*Primary Examiner*—Kuo-Liang Peng
(74) *Attorney, Agent, or Firm*—Bradford B. Wright (57) ABSTRACT

An adhesive article comprising a fluorothermoplastic film having a major surface; and a pressure sensitive adhesive layer adhered to at least a portion of the first major surface, wherein the pressure sensitive adhesive comprises a silicone polyurea block copolymer and an MQ tackifying resin. Composite articles preparable from the adhesive articles, and methods of making the same are also disclosed.

2 Claims, 1 Drawing Sheet

ADHESIVE ARTICLE, COMPOSITE ARTICLE, AND METHODS OF MAKING THE SAME

BACKGROUND

Fluorothermoplastics (i.e., melt-processable fluoropolymers) can be processed in a variety of manners such as extrusion, injection molding, compression molding, transfer molding and blow molding. Fluorothermoplastics typically have properties such as, for example, low gas permeability, chemical inertness, and low surface energy and have been used in applications ranging from wiring insulation to valves, tubes and pipes, low permeation tubing, radiation resistant film, films, textiles, and papermaking. For example, adhering a fluorothermoplastic film to a substrate typically confers a degree of solvent, water, and weathering resistance to the substrate. In such applications, the choice of fluorothermoplastics that may be used for a specific application may be restricted by the degree of adhering that may be attained between the fluorothermoplastic and the substrate.

Some physical properties of fluorothermoplastics typically differ from fluoropolymers that cannot be melt-processed. For example, polytetrafluoroethylene (PTFE)) has such a high melting point that it cannot be melt-processed and is typically sintered instead, resulting in porous materials that, especially as films, typically have a degree of gas permeability in excess of that observed with a nonporous fluorothermoplastic.

In general, low surface energy fluorothermoplastics are known for their poor adhesion to dissimilar materials such as, for example, pressure sensitive adhesives. To overcome this problem, various methods for improving the adhesive properties of fluorothermoplastics have been heretofore investigated. Those methods include modifying the surface of the fluorothermoplastic (e.g., by radiation or chemical treatment), and interposing a special layer (e.g., a tie layer or primer) between the pressure sensitive adhesive and the fluorothermoplastic. However, such methods require additional steps and add complexity and cost to the finished adhesive articles.

SUMMARY

In one aspect, the present invention provides an adhesive article comprising:

a fluorothermoplastic film having a major surface; and a pressure sensitive adhesive layer adhered to at least a portion of the major surface, wherein the pressure sensitive adhesive comprises a silicone polyurea block copolymer and an MQ tackifying resin, and wherein the silicone polyurea block copolymer comprises n blocks represented by the formula and m blocks represented by the formula wherein each R independently represents a monovalent group selected from the group consisting of alkyl groups, vinyl groups, higher alkenyl groups, cycloalkyl groups, aryl groups, and fluorine-containing groups;

each Z independently represents a divalent group selected from the group consisting of arylene groups, alkarylene groups, aralkylene groups, alkylene groups, and cycloalkylene groups, and combinations thereof.

each Y independently represents a divalent group selected from the group consisting of alkylene groups, alkarylene groups, aralkylene groups, arylene groups, and combinations thereof, each D is independently selected from the group consisting of hydrogen, alkyl groups having 1 to 10 carbon atoms, phenyl, and groups that complete a ring structure including B or Y to form a heterocycle;

each B independently represents a divalent group selected from the group consisting of alkylene groups, alkarylene groups, aralkylene groups, cycloalkylene groups, arylene groups, and poly(alkyleneoxy) groups, and combinations thereof, p is an integer number that is at least 10;

n is an integer that is at least 1; and m is an integer in a range of from at least 1 up to and including 1,000, and wherein the ratio of n to m is in a range of from about 1:10 to about 10:1.

At least a portion of the adhesive layer of adhesive articles according to the present invention may be adhesively adhered to a release liner or other substrate to form various composite articles.

In yet another aspect, the present invention provides a method of making an adhesive article, the method comprising adhering a pressure sensitive adhesive layer to at least a portion of a major surface of a fluorothermoplastic film, wherein the pressure sensitive adhesive comprises a silicone polyurea block copolymer and an MQ tackifying resin, wherein the pressure sensitive adhesive comprises a silicone polyurea block copolymer and an MQ tackifying resin, and wherein the silicone polyurea block copolymer comprises n blocks represented by the formula and m blocks represented by the formula wherein each R independently represents a monovalent group selected from the group consisting of alkyl groups, vinyl groups, higher alkenyl groups, cycloalkyl groups, aryl groups, and fluorine-containing groups;

each Z independently represents a divalent group selected from the group consisting of arylene groups, alkarylene groups, aralkylene groups, alkylene groups, and cycloalkylene groups, and combinations thereof.

each Y independently represents a divalent group selected from the group consisting of alkylene groups, alkarylene groups, aralkylene groups, arylene groups, and combinations thereof, each D is independently selected from the group consisting of hydrogen, alkyl groups having 1 to 10 carbon atoms, phenyl, and groups that complete a ring structure including B or Y to form a heterocycle;

each B independently represents a divalent group selected from the group consisting of alkylene groups, alkarylene groups, aralkylene groups, cycloalkylene groups, arylene groups, and poly(alkyleneoxy) groups, and combinations thereof, p is an integer number that is at least 10;

n is an integer that is at least 1; and m is an integer in a range of from at least 1 up to and including 1,000, and wherein the ratio of n to m is in a range of from about 1:10 to about 10:1.

It is discovered that the above-identified tackified silicone polyurea block copolymers typically aggressively bond to fluorothermoplastics without the need for additional surface treatments of the fluorothermoplastics. It is surprisingly further discovered that the above-identified tackified silicone polyurea block copolymers typically bond less aggressively to higher energy substrates such as for example, glass. Accordingly, in some embodiments, if the pressure sensitive adhesive layer of the adhesive article is adhered to glass and peeled according to the 180° Peel Adhesion Test, then the pressure sensitive adhesive layer cleanly releases from the glass and remains adhered to the nonporous fluorothermoplastic film.

As used herein:

"cleanly releases" means releases without leaving residue visible to an unaided human eye;

"film" refers to a thin sheet or strip of flexible material;

"fluoropolymer" refers to an organic polymer having a fluorine content of at least 20 percent by weight;

"fluorothermoplastic" refers to a melt-processible thermoplastic fluoropolymer; by definition, polytetrafluoroethylene is not a fluorothermoplastic;

"pressure sensitive adhesive" or "PSA" refers to a viscoelastic material that possesses the following properties: (1) aggressive and permanent tack, (2) adherence to a substrate other than a fluorothermoplastic film with no more than finger pressure, and (3) sufficient cohesive strength to cleanly release from the substrate; and "silicone polyurea block copolymer" refers to a polymer containing at least two silicone segments connected to one or more non-silicone segments through urea linkages.

DETAILED DESCRIPTION

Figure 1:
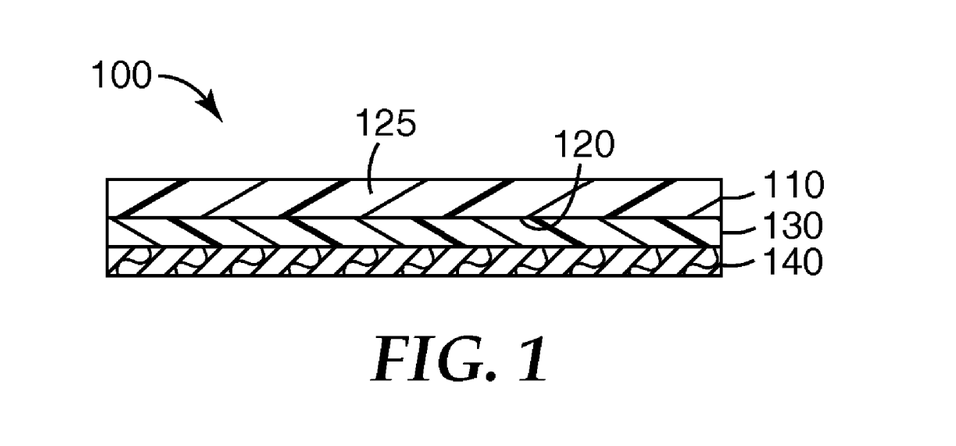
FIG. 1 is a cross-sectional view of an exemplary an adhesive article according to the present invention.

An exemplary fluorothermoplastic adhesive film is shown in FIG. 1. Referring now to FIG. 1, fluorothermoplastic adhesive film 100 has fluorothermoplastic film 110 with interior portion 125 and major surface 120. In some embodiments, major surface 120 and interior portion 125 have the same composition. Pressure sensitive adhesive layer 130 comprising a silicone polyurea block copolymer and a tackifier is adhered to at least a portion of major surface 120. Optional release liner 140 is releasably adhered to pressure sensitive adhesive layer 130.

Figure 2:
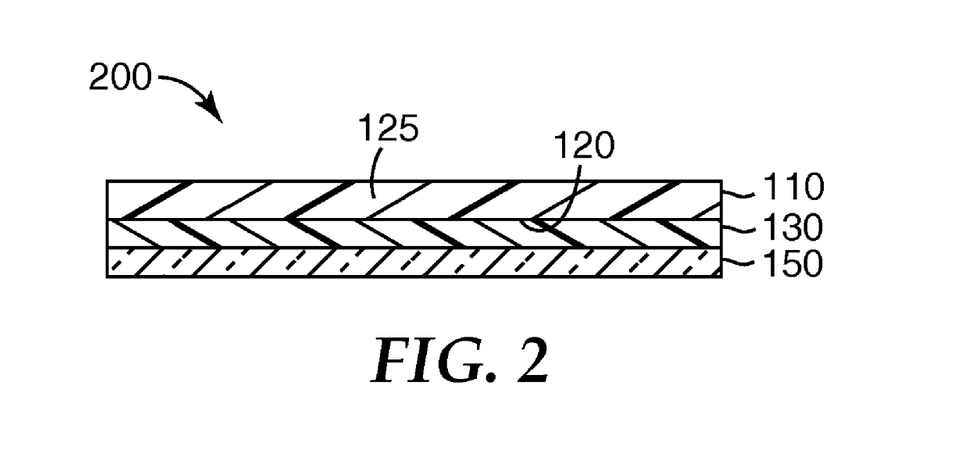
FIG. 2 is a cross-sectional view of a composite article according to the present invention.

Fluorothermoplastic adhesive films according to the present invention are useful for preparing composite articles. Referring now to FIG. 2, exemplary composite article 200 has fluorothermoplastic film 110 with major surface 120 and interior portion 125. Pressure sensitive adhesive layer 130 is adhered to at least a portion of first major surface 120. Substrate 150 is adhered to pressure sensitive adhesive layer 130.

Fluorothermoplastic films may be obtained commercially, or may be formed from fluorothermoplastic polymers by extrusion or pressing.

Useful fluorothermoplastic polymers include thermoplastic polymers having a backbone comprising one or more subunits having the structure —$CH_2CFX$—, wherein X represents H, Cl, or F. The subunits may, or may not, correspond to monomeric units.

Exemplary fluorothermoplastic polymers include polyvinylidene fluorides, for example, those marketed under the trade designations "TEDLAR" (by E. I. du Pont de Nemours and Company, Wilmington, Del.; "KYNAR" by (Arkema, Inc., Philadelphia, Pa.), and "HYLAR" (by Ausimont USA, Morristown, N.J.); polyvinyl fluorides; tetrafluoroethylene-perfluoroalkyl vinyl ether copolymers, for example, those marketed under the trade designation "TEFLON PFA" (by E. I. du Pont de Nemours and Company); tetrafluoroethylene-ethylene copolymers, for example, those marketed under the trade designations "ET 6210J", "ET 6235", or "ET 6240J" (Dyneon, Oakdale, Minn.); hexafluoropropylene-vinylidene fluoride copolymers, for example, that marketed under the trade designation "DAIEL T-530" (Daikin America, Orangeburg, N.Y.); tetrafluoroethylene-ethylene-propylene copolymers; tetrafluoroethylene-ethylene-perfluoroalkyl vinyl ether copolymers; tetrafluoroethylene-ethylene-heptafluoropentene copolymers; tetrafluoroethylene-ethylene-perfluorobutylethylene copolymers; tetrafluoroethylene-ethylene-hexafluoropropylene copolymers, for example, those marketed under the trade designation "HTE" (by Dyneon); tetrafluoroethylene-propylene copolymers, for example, those marketed under the trade designations "AFLAS" (by Asahi Glass, Tokyo, Japan), or "VITON" (by E. I. du Pont de Nemours and Company); tetrafluoroethylene-propylene-vinylidene fluoride copolymers, for example, those marketed under the trade designation "AFLAS" (by Asahi Glass, Tokyo, Japan); tetrafluoroethylene-hexafluoropropylene copolymers, for example, those marketed under the trade designation "TEFLON FEP" (by E. I. du Pont de Nemours and Co.); tetrafluoroethylene-hexafluoropropylene-perfluoroalkyl vinyl ether copolymers; tetrafluoroethylene-hexafluoropropylene-vinylidene fluoride copolymers, for example, those fluoropolymers marketed under the trade designation "THV" (by Dyneon); tetrafluoroethylene-hexafluoropropylene-vinylidene fluoride-tetrafluoroiodopropoxytrifluoroethylene copolymers; tetrafluoroethylene-vinylidene fluoride copolymers; chlorotrifluoroethylene-ethylene copolymers, for example, those marketed under the trade designation "HALAR" (by Allied Chemical Corporation, Morristown, N.J.); chlorotrifluoroethylene-vinylidene fluoride copolymers; vinylidene fluoride-hexafluoropropylene copolymers; and vinylidene fluoride-trifluoroethylene copolymers.

In some embodiments, the fluorothermoplastic film comprises at least one fluorothermoplastic polymer selected from the group consisting of tetrafluoroethylene-hexafluoropropylene-vinylidene fluoride copolymers; tetrafluoroethylene-hexafluoropropylene copolymers; tetrafluoroethylene-perfluoropropyl vinyl ether copolymers; tetrafluoroethylene-hexafluoropropylene copolymers; ethylene-tetrafluoroethylene copolymers; and tetrafluoroethylene-hexafluoropropylene-ethylene copolymers.

If desired, one or both surfaces of a fluorothermoplastic film may be modified to improve adhesion. Useful methods for modifying the surface include radiation or chemical treatments (e.g., sodium naphthalide). However, typically, adhesion of the pressure sensitive adhesive layer to the fluorothermoplastic film is sufficiently great that this does not improve the overall adhesion level.

Various additives such as colorants (e.g., pigments and dyes), fillers, UV-absorbers may be added to the fluorothermoplastic polymers if desired.

In general, the thickness of the fluorothermoplastic film is in a range of from about 5 micrometers to about 1,000 micrometers, preferably in a range of from about 25 micrometers to about 500 micrometers, and more preferably in a range of from about 100 micrometers to about 300 micrometers, although thicker or thinner films may also be used.

The pressure sensitive adhesive layer comprises at least one tackifier and at least one silicone polyurea block copolymer. The silicone polyurea block copolymer comprises n blocks represented by the formula and m blocks represented by the formula wherein:

Each R independently represents a monovalent group selected from the group consisting of alkyl groups (e.g., methyl or ethyl), vinyl groups, higher alkenyl groups, cycloalkyl groups, aryl groups, and fluorine-containing groups. For example, each R may independently represent an alkyl group, preferably having about 1 to 12 carbon atoms, and which may be substituted with, for example, trifluoroalkyl and/or vinyl groups; a vinyl radical or higher alkenyl radical, preferably represented by the formula $R_2(CH_2)_a CH=CH_2$ wherein $R_2$ is $-(CH_2)_b-$ or $-(CH_2)_c CH=CH-$ wherein a is 1, 2 or 3, b is 0, 3 or 6 and c is 3, 4 or 5; a cycloalkyl moiety having from about 6 to 12 carbon atoms and which may be substituted with alkyl, fluoroalkyl, and/or vinyl groups; or an aryl moiety preferably having from about 6 to 20 carbon atoms and may be substituted with, for example, alkyl, cycloalkyl, fluoroalkyl, and/or vinyl groups; or a perfluoroalkyl group as described in U.S. Pat. No. 5,028,679 (Terae et al.), or a fluorine-containing group as described in U.S. Pat. No. 5,236,997 (Fujiki), or a perfluoroether-containing group, as described in U.S. Pat. No. 4,900,474 (Terae et al.) and U.S. Pat. No. 5,118,775 (Inomata et al.), the disclosures of which foregoing patents are incorporated herein by reference. Preferably, at least 50% of the R moieties are methyl radicals with the balance being monovalent alkyl or substituted alkyl radicals having from 1 to 12 carbon atoms, alkenylene radicals, phenyl radicals, or substituted phenyl radicals.

Each Z independently represents a divalent group selected from the group consisting of arylene groups, alkarylene groups, aralkylene groups, alkylene groups, and cycloalkylene groups, and combinations thereof. Preferably, Z has from about 1 (e.g., in the case of alkylene) or 6 (e.g., in the case of arylene or cycloalkylene) to about 20 carbon atoms. Examples of suitable Z groups include 2,6-tolylene, 4,4'-methylenediphenylene, $-CH_2C_6H_4C(CH_3)_2C_6H_4CH_2-$, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene or a mixture thereof.

Each Y independently represents a divalent group selected from the group consisting of alkylene groups, preferably having from 1 to 10 carbon atoms (e.g., $-CH_2-$ or $-CH_2CH_2CH_2-$); alkarylene groups, preferably having from 6 to 20 carbon atoms; aralkylene groups, preferably having from 6 to 20 carbon atoms; arylene groups, preferably having from 6 to 20 carbon atoms; and combinations thereof.

Each D is independently selected from the group consisting of hydrogen, alkyl groups having 1 to 10 carbon atoms, phenyl, and groups that complete a ring structure including B or Y to form a heterocycle.

Each B independently represents a divalent group selected from the group consisting of alkylene groups (e.g., $-CH_2-$, $-CH_2CH_2CH_2-$, $-CH_2CH_2CH_2CH(CH_3)-$) and, alkarylene groups, aralkylene groups, cycloalkylene groups, arylene groups, and poly(alkyleneoxy) groups (e.g., poly(ethylenoxy), poly(propylenoxy), poly(tetramethyleneoxy)), and combinations thereof.

m is an integer in a range of from at least 1 up to and including 1,000.

n is an integer that is at least 1; and p is an integer number that is at least 10, preferably about 15 to about 2,000, more preferably 30 to 1500.

The ratio of n to m is in a range of from about 1:10 to about 10:1. For example, the ratio of n to m (i.e., n/m) may be in a range of from about 1:5 to about 5:1, or in a range of from about 1:2 to about 2:1. In some embodiments, the ratio of n to m may be about one.

Examples of useful silicone diamines used in the preparation of silicone polyurea block copolymers include polydiorganosiloxane diamines represented by the formula wherein each of R, Y, D, and p are defined as above. Preferably the number average molecular weight of the polydiorganosiloxane diamines is greater than about 700 g/mole.

Useful polydiorganosiloxane diamines include any polydiorganosiloxane diamines that fall within Formula II above and include those polydiorganosiloxane diamines having molecular weights in the range of about 700 to 150,000 g/mole, preferably from about 10,000 to about 60,000 g/mole, more preferably from about 25,000 to about 50,000 g/mole. Suitable polydiorganosiloxane diamines and methods of manufacturing polydiorganosiloxane diamines are disclosed in, e.g., U.S. Pat. No. 3,890,269 (Martin); U.S. Pat. No. 4,661,577 (Lane); U.S. Pat. No. 5,026,890 (Webb et al.), and U.S. Pat. No. 5,276,122 (Aoki et al.); the disclosures of which are incorporated herein by reference; and in PCT Patent Publ. Nos. WO 95/03354 A1 (Leir et al.) and WO 96/35458 A2 (Melancon et al.).

Examples of useful polydiorganosiloxane diamines include polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures and copolymers thereof.

Suitable polydiorganosiloxane diamines are commercially available from, for example, Shin Etsu Silicones of America, Inc., Torrance, Calif., and Huls America, Inc. Preferably, the polydiorganosiloxane diamines are substantially pure and prepared as disclosed in U.S. Pat. No. 5,214,119 (Leir et al.). Polydiorganosiloxane diamines having such high purity may be prepared from the reaction of cyclic organosilanes and bis(aminoalkyl)disiloxanes utilizing an anhydrous amino alkyl functional silanolate catalyst such as tetramethylammonium-3-aminopropyldimethyl silanolate, preferably in an amount less than 0.15% by weight based on the weight of the total amount of cyclic organosiloxane with the reaction run in two stages. Particularly useful are polydiorganosiloxane diamines prepared using cesium and rubidium catalysts as disclosed, for example, in U.S. Pat. No. 5,512,650 (Leir et al.).

The polydiorganosiloxane diamine component provides a means of adjusting the modulus of the resultant silicone polyurea block copolymer. In general, high molecular weight polydiorganosiloxane diamines provide copolymers of lower modulus whereas low molecular polydiorganosiloxane polyamines provide copolymers of higher modulus.

Optionally a polyamine that does not contain polysiloxane groups (referred to hereinafter as "optional polyamine") derived block may be included in the silicone polyurea block copolymer. Examples of useful polyamines that may serve as precursors to such blocks include polyoxyalkylene diamines including, e.g., polyoxyalkylene diamines commercially available under the trade designations "D-230", "D-400", "D-2000", "D-4000", "ED-2001" and "EDR-148" from Huntsman Corporation, Houston, Tex., polyoxyalkylene triamines including, e.g., polyoxyalkylene triamines commercially available under the trade designations "T-403", "T-3000" and "T-5000" from Huntsman, and aliphatic polyamines including, e.g., ethylene diamine, available under the trade designations "DYTEK A" (2-methylpentamethylenediamine) and "DYTEK EP" (1,3-pentanediamine) from E. I. du Pont de Nemours and Company, Wilmington, Del.

Silicone diamines may also be prepared according to the method described in U.S. Pat. No. 6,531,620 (Brader et al.), the disclosure of which is incorporated herein by reference.

Any polyisocyanate including, e.g., diisocyanates and triisocyanates, capable of reacting with the above-described polyamines can be used in the preparation of the silicone polyurea block copolymer. Examples of suitable diisocyanates include aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3', 5,5'-tetraethyl)diphenylmethane, 4,4-diisocyanato-3,3'-dimethoxybiphenyl (o-dianisidine diisocyanate), 5-chloro-2, 4-toluene diisocyanate, and 1-chloromethyl-2,4-diisocyanatobenzene, aromatic-aliphatic diisocyanates, such as m-xylylene diisocyanate and tetramethyl-m-xylylene diisocyanate, aliphatic diisocyanates such as 1,4-diisocyanatobutane, 1,6-diisocyanatohexane, 1,12-diisocyanatododecane and 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate) and cyclohexylene-1,4-diisocyanate.

Any triisocyanate that can react with a polyamine, and in particular with the polydiorganosiloxane diamine is suitable. Examples of such triisocyanates include, e.g., polyfunctional isocyanates, such as those produced from biurets, isocyanurates, and adducts. Examples of commercially available polyisocyanates include portions of the series of polyisocyanates available under the trade designations "DESMODUR" and "MONDUR" from Bayer Corp., Pittsburgh, Pa., and "PAPI" from Dow Chemical Co., Midland, Mich.

The polyisocyanate is preferably present in a stoichiometric amount based on the amount of polydiorganosiloxane diamine and optional polyamine.

The silicone polyurea block copolymer can be prepared by solvent-based processes, solventless processes or a combination thereof. Useful solvent-based processes are described by Tyagi et al. in "Segmented Organosiloxane Copolymers: 2. Thermal and Mechanical Properties of Siloxane-Urea Copolymers" in Polymer, vol. 25, December, 1984, and U.S. Pat. No. 5,214,119 (Leir et al.), the disclosure of which is incorporated herein by reference.

Silicone polyurea block copolymer-based pressure sensitive adhesive compositions can also be prepared by solvent-based processes, solventless processes or a combination thereof.

In solvent-based processes, the MQ silicone resin can be introduced before, during or after the polyamines and polyisocyanates have been introduced into the reaction mixture. The reaction of the polyamines and the polyisocyanate is carried out in a solvent or a mixture of solvents. The solvents are preferably nonreactive with the polyamines and polyisocyanates. The starting materials and final products preferably remain completely miscible in the solvents during and after the completion of the polymerization. These reactions can be conducted at room temperature or up to the boiling point of the reaction solvent. The reaction is preferably carried out at ambient temperature up to 50° C.

In substantially solventless processes, the polyamines and the polyisocyanate and the MQ silicone resin are mixed in a reactor and the reactants are allowed to react to form the silicone polyurea block copolymer, which, with the MQ resin, forms the pressure sensitive adhesive composition.

One useful method that includes a combination of a solvent-based process and a solventless process includes preparing the silicone polyurea block copolymer using a solventless process and then mixing silicone polyurea block copolymer with the MQ resin solution in a solvent. Preferably, the silicone polyurea block copolymer-based pressure sensitive adhesive composition prepared according to the above-described combination method.

The molar ratio of amine components (silicone diamine and optional polyamine) to diisocyanate in the reaction is that suitable for the formation of a block copolymer with desired properties. Typically, the ratio is maintained in a range of from about 1:0.9 to about 1:1.1; for example, in a range of from about 1:0.95 to about 1:1.05, or even in a range of from about 1:0.98 to about 1:1.02.

Further details concerning silicone polyurea block copolymers and methods for their synthesis may be found in, for example, U.S. Publ. Pat. Appln. No. 2003/0175510 A1 (Sherman et al.); and in U.S. Pat. No. 5,214,119 (Leir et al.); U.S. Pat. No. 5,461,134 (Leir et al.); U.S. Pat. No. 5,512,650 (Leir et al.); U.S. Pat. No. 6,407,195 (Sherman et al.); U.S. Pat. No. 6,441,118 (Sherman et al.); U.S. Pat. No. 6,569,521 (Sheridan et al.); U.S. Pat. No. 6,664,359 (Kangas et al.); U.S. Pat. No. 6,846,893 (Sherman et al.); the disclosures of which are incorporated herein by reference.

The pressure sensitive adhesive includes sufficient MQ tackifying resin to tackify at least one silicone polyurea block copolymer. The MQ tackifying resin and the silicone polyurea block copolymer can be present in the form of, e.g., a blend of MQ tackifying resin and silicone polyurea block copolymer.

Typically, the silicone polyurea block copolymer is present in the pressure sensitive adhesive in an amount of from about 30% by weight to about 70% by weight, more typically 35% by weight to 65% by weight, based on the total weight of the pressure sensitive adhesive, however other amounts may also be used.

The MQ tackifying resin is typically present in the pressure sensitive adhesive composition in an amount of from about 30% by weight to about 70% by weight, preferably from about 40% by weight to about 60% by weight, more preferably 45% by weight to 55% by weight, based on the total weight of the pressure sensitive adhesive, however other amounts may also be used.

Useful MQ tackifying resins include, e.g., MQ silicone resins, MQD silicone resins, and MQT silicone resins, which also may be referred to as copolymeric silicone resins and which preferably have a number average molecular weight of about 100 to about 50,000, more preferably about 500 to about 20,000 and generally have methyl substituents. The MQ silicone resins include both non-functional and functional resins, the functional resins having one or more functionalities including, for example, silicon-bonded hydrogen, silicon-bonded alkenyl, and silanol.

MQ silicone resins are copolymeric silicone resins having $R'_3SiO_{1/2}$ units (M units) and $SiO_{4/2}$ units (Q units). Such resins are described in, for example, *Encyclopedia of Polymer Science and Engineering*, vol. 15, John Wiley & Sons, New York, ©1989, pp. 265 to 270, and U.S. Pat. No. 2,676,182 (Daudt et al.); U.S. Pat. No. 3,627,851 (Brady); U.S. Pat. No. 3,772,247 (Flannigan); and U.S. Pat. No. 5,248,739 (Schmidt et al.), the disclosures of which patents are incorporated herein by reference. MQ silicone resins having functional groups are described in U.S. Pat. No. 4,774,310 (Butler), which describes silyl hydride groups, U.S. Pat. No. 5,262,558 (Kobayashi et al.), which describes vinyl and trifluoropropyl groups, and U.S. Pat. No. 4,707,531 (Shirahata), which describes silyl hydride and vinyl groups, the disclosures of which are incorporated herein. The above-described resins are generally prepared in solvent. Dried or solventless MQ silicone resins are prepared as described in U.S. Pat. No. 5,319,040 (Wengrovius et al.); U.S. Pat. No. 5,302,685 (Tsumura et al.); and U.S. Pat. No. 4,935,484 (Wolfgruber et al.); the disclosures of which are incorporated herein by reference.

MQD silicone resins are terpolymers having $R'_3SiO_{1/2}$ units (M units) and $SiO_{4/2}$ units (Q units) and $R'_2SiO_{2/2}$ units (D units) as described, e.g., in U.S. Pat. No. 5,110,890 (Butler), the disclosure of which is incorporated herein by reference.

MQT silicone resins are terpolymers having $R'_3SiO_{1/2}$ units (M units), $SiO_{4/2}$ units (Q units), and $R'SiO_{3/2}$ units (T units).

Commercially available MQ tackifying resins include resins available in toluene under the trade designation "SR-545 MQ" from General Electric Co., Silicone Resins Division, Waterford, N.Y.; MQOH resins which are MQ silicone resins in toluene available from PCR, Inc., Gainesville, Fla. Such resins are generally supplied in organic solvent. These organic solutions of MQ silicone resin may be used as is or may be dried by any number of techniques known in the art including, e.g., spray drying, oven drying, and steam separation, to provide a MQ silicone resin at 100 percent nonvolatile content. The MQ silicone resin can also include blends of two or more silicone resins.

The pressure sensitive adhesive may contain one or more light stabilizers (for example, UV absorbers or hindered amine-light stabilizers), antioxidants, colorants, fragrances, and combinations thereof.

Suitable optional release liners include, for example, polymeric films and papers that have optionally been treated with a release agent such as silicone. For example, the optional release liner may comprise a sheet material such as a polyester web, a polyethylene web, or a polystyrene web, or a polyethylene-coated paper, coated with a suitable silicone based coating.

Adhesive articles and composite articles according to the present invention may be converted to a variety of forms including, for example, strips, sheets, and rolls.

In general, it was discovered that the pressure sensitive adhesive layer of adhesive articles according to the present invention, typically aggressively adheres to fluorothermoplastics (e.g., fluorothermoplastic films) and, in some embodiments, other substrates resulting in cohesive failure modes (i.e., in the adhesive) in composite structures wherein an adhesive article according to the present invention is bonded to a substrate.

Further, it is discovered in the case of silicone polyurea block copolymers having a block with a formula weight in a range of from about 10,000 to about 37,000 grams per mole (e.g., from about 14,000 to about 35,000 grams per mole), and a ratio of n to m in a range of from about 10:1 to about 1:10, that the adhesion (e.g., as measured by 180° peel adhesion) to other substrates is typically less than that observed to the unmodified fluorothermoplastic. Indeed, the strength of adhesion is typically sufficiently strong that, if adhesive articles according to the present invention are adhered to a substrate having a higher surface energy than the fluorothermoplastic film, they can typically be cleanly removed from the substrate by peeling.

Suitable substrates include, for example, glass, polymers (e.g., polyester, polyamide, polymethyl methacrylate, polypropylene), metal (including painted metal), fiberglass, and ceramic.

Accordingly, adhesive articles according to the present invention may be useful, for example, as adherent protective films for glass (e.g., displays of electronic devices or windows), architectural surfaces (e.g., walls, doors, floors), graphic articles (e.g., commercial signage or highway signage), motor vehicles (e.g., cars, trucks or buses), watercraft (e.g., boats or jet skis), airplanes, and many commercial polymeric substrates (e.g., polyesters or polyamides).

In some cases, silicone polyurea block copolymers having a block with a formula weight outside the range of from about 10,000 to about 37,000 grams per mole, and a ratio of n to m in a range of from about 10:1 to about 1:10, may also exhibit the same or similar properties.

Objects and advantages of this invention are further illustrated by the following non-limiting examples, but the particular materials and amounts thereof recited in these examples, as well as other conditions and, details, should not be construed to unduly limit this invention.

EXAMPLES

Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., or may be synthesized by conventional methods.

Test Methods

180° Peel Adhesion Test

This peel adhesion test is performed according to ASTM D 3330-90; however, instead of testing tapes adhered to a stainless steel substrate, 3-layer laminates of substrate/adhesive/fluoropolymer film of 1.27 centimeters by 15 centimeters are adhered to a 17.8 centimeter by 33 centimeter steel panel using double-coated adhesive tape (commercially available from 3M Company under the trade designation "410B") via the substrate side using a 2.3-kg rubber roller. The fluoropolymer/adhesive is then peeled at 180° at using an IMass model SP2000 peel tester obtained from IMASS, Inc., Accord, Mass. or using an Instron peel tester available from the Instron Company, Canton, Mass. The failure mode is noted as "cohesive" if adhesive residue remains on both the substrate and the fluoropolymer film, or "adhesive" if the adhesive residue remained only on either the substrate or the fluoropolymer film. For adhesive failure, the site of failure is also noted, i.e., whether the substrate/adhesive bond fails "failure at the substrate" or the fluoropolymer/adhesive bond fails "failure at the fluoropolymer film". Measurements are obtained in ounces/inch and converted to Newtons per centimeter (N/cm).

| TABLE OF ABBREVIATIONS | |
|---|---|
| ABBREVIATION | DESCRIPTION |
| Film 1 | film of 203 micrometers (8 mils) thickness which is a terpolymer of tetrafluoroethylene/hexafluoropropylene/vinylidene fluoride commercially available from Dyneon Corp., St. Paul, Minnesota under the trade name "THV 500G". |
| Film 2 | film of 254 micrometers (10 mils) thickness which is a copolymer of ethylene/tetrafluoroethylene commercially available from Dyneon Corp., St. Paul, Minnesota under the trade name "ETFE 6235". |
| Film 3 | film of 203 micrometers (8 mils) thickness which is a copolymer of tetrafluoroethylene/hexafluoropropylene commercially available from Dyneon Corp., St. Paul, Minnesota under the trade name "FEP 6307". |
| Film 4 | film of 203 micrometers (8 mils) thickness which is a terpolymer of ethylene/tetrafluoroethylene/hexafluoropropylene commercially available from Dyneon Corp., St. Paul, Minnesota under the trade name "EFEP". |
| Film 5 | aminated-polybutadiene primed polyester film of polyethylene terephthalate having a thickness of 38 micrometers. |
| Film 6 | film of 203 micrometers (8 mils) thickness, which is a terpolymer of tetrafluoroethylene/hexafluoropropylene/vinylidene fluoride. |
| Film 7 | film of 51 micrometers (2 mils) thickness which is a terpolymer of tetrafluoroethylene/hexafluoropropylene/vinylidene fluoride commercially available from Dyneon Corp., St. Paul, Minnesota under the trade name "THV 500G". |
| Film 8 | film of 8 mils micrometers (200 micrometers) thickness which is a copolymer of tetrafluoroethylene/hexafluoropropylene commercially available from Dyneon Corp., St. Paul, Minnesota under the trade name "FEP 6307". |
| Film 9 | film of 2 mils (50 micrometers) thickness which is a copolymer of tetrafluoroethylene/hexafluoropropylene commercially available from) thickness which is a copolymer of tetrafluoroethylene/hexafluoropropylene, commercially available from E. I. du Pont de Nemours and Company under the trade designation "TEFLON FEP". |
| Film 10 | film of 2 mils (50 micrometers) thickness which is a copolymer of tetrafluoroethylene/perfluoropropyl vinyl ether, commercially available from) thickness which is a copolymer of tetrafluoroethylene/hexafluoropropylene, commercially available from E. I. du Pont de Nemours and Company under the trade designation "TEFLON PFA". |
| Film 11 | 8 mils (200 micrometers) thickness film of terpolymer (tetrafluoroethylene, hexafluoropropylene, and ethylene) commercially available from Dyneon, LLC under the trade designation "HTE15 10". |
| Film 12 | 4 mils (100 micrometers) thickness nylon 6,6 film without surface treatment available under the trade designation "C917 Nylon 6,6" from E. I. du Pont de Nemours and Company, Wilmington, Delaware. |
| Film 13 | 2 mils (50 micrometers) thickness (7 md × 7 td) biaxially oriented polypropylene film made from polypropylene resin available under the trade designation "PP3376" from Total Petrochemicals USA, Houston, Texas. |
| Film 14 | 12 mils (300 micrometers) thickness polyester film |
| MQ Resin 1 | 60% solids solution of MQ silicate resin in toluene, commercially available from GE Silicones, Waterford, New York, under the trade designation SR-545. |
| MQ Resin 2 | 62.9% solids solution of MQ silicate resin in xylene, commercially available from Dow Corning Corporation, Midland, Michigan, under the trade designation 2–7066. |
| DYTEK A | organic diamine, commercially available from DuPont Chemical, Wilmington, Delaware. |
| H-MDI | methylenedicyclohexylene-4,4'-diisocyanate, commercially available under the trade designation "DESMODUR W $H_{12}$-MDI" from Bayer Corporation, Pittsburgh, Pennsylvania. |
| PDMS diamine 33,000 | approximately 33,000 g/mole molecular weight polydimethylsiloxane diamine prepared as described in Example 2 of U.S. Pat. No. 5,461,134 (Leir et al.). |

TABLE OF ABBREVIATIONS

| ABBRE-VIATION | DESCRIPTION |
|---|---|
| PDMS diamine 94,000 | approximately 94,000 g/mole molecular weight polydimethylsiloxane diamine prepared as described in Example 2 of U.S. Pat. No. 5,461,134 (Leir et al.). |
| PDMS diamine 35,000 | approximately 35,000 g/mole molecular weight polydimethylsiloxane diamine prepared as described in Example 2 of U.S. Pat. No. 5,461,134 (Leir et al.). |
| PDMS diamine 14,000 | approximately 14,000 molecular weight polydimethylsiloxane diamine prepared as described in Example 2 of U.S. Pat. No. 5,461,134 (Leir et al.). |
| PMMA | 120 mils thickness polymethyl methacrylate plate. |

Preparative Examples

Adhesive A

A 30% solids adhesive solution in a mixture of 70 parts toluene and 30 parts isopropanol was prepared. The adhesive was a 50:50 mixture by weight of elastomer:MQ Resin 1, the elastomer was a copolymer of PDMS diamine 33,000/DYTEK A/H-MDI in a molar ratio of 1/0.5/1.5.

Adhesive B

A 25% solids adhesive solution in a mixture of 85 parts toluene and 15 parts isopropanol was prepared. The adhesive was a 50:50 mixture by weight of elastomer:MQ Resin 2, the elastomer was a copolymer of PDMS diamine 33,000/DYTEK A/H-MDI in a molar ratio of 1/1/2.

Adhesive C

A 30% solids adhesive solution in a mixture of in 70 parts toluene and 30 parts isopropanol was prepared. The adhesive was a 40:60 mixture by weight of elastomer:MQ Resin 1, the elastomer was a copolymer of PDMS diamine 33,000/DYTEK A/H-MDI in a molar ratio of 1/0.5/1.5.

Adhesive D

A 25% solids adhesive solution in a mixture of 85 parts toluene and 15 parts isopropanol was prepared. The adhesive was a 45:55 mixture by weight of elastomer:MQ Resin 2, the elastomer was a copolymer of PDMS diamine 33,000/DYTEK A/H-MDI in a molar ratio of 1/1/2.

Adhesive E

A 25% solids adhesive solution in a mixture of 85 parts toluene and 15 parts isopropanol was prepared. The adhesive was a 40:60 mixture by weight of elastomer:MQ Resin 2, the elastomer was a copolymer of PDMS diamine 33,000/DYTEK A/H-MDI in a molar ratio of 1/1/2.

Adhesive F

A 30% solids adhesive solution in a mixture of in 70 parts toluene and 30 parts isopropanol was prepared. The adhesive was a 50:50 mixture by weight of elastomer:MQ Resin 1, the elastomer was a copolymer of PDMS diamine 94,000/DYTEK A/H-MDI in a molar ratio of 1/0.5/1.5.

Adhesive G

A 30% solids adhesive solution in a mixture of in 70 parts toluene and 30 parts isopropanol was prepared. The adhesive was a 50:50 mixture by weight of elastomer:MQ Resin 1, the elastomer was a copolymer of PDMS diamine 35,000/DYTEK A/H-MDI in a molar ratio of 1/0.5/1.5.

Adhesive H

A 30% solids adhesive solution in a mixture of in 70 parts toluene and 30 parts isopropanol was prepared. The adhesive was a 50:50 mixture by weight of elastomer:MQ Resin 1, the elastomer was a copolymer of PDMS diamine 14,000/DYTEK A/H-MDI in a molar ratio of 1/0.5/1.5.

Adhesive I

A 25% solids adhesive solution in a mixture of in 85 parts toluene and 15 parts isopropanol was prepared. The adhesive was a 50:50 mixture by weight of elastomer:MQ Resin 1, the elastomer was a copolymer of PDMS diamine 33,000/DYTEK A/H-MDI in a molar ratio of 1/0.5/1.5.

Adhesive J

A 40% solids adhesive solution in a mixture of in 39 parts toluene and 21 parts isopropanol was prepared. The adhesive was a 5:3 mixture by weight of elastomer:MQ Resin 1, the elastomer was a copolymer of PDMS diamine 33,000/DYTEK A/H-MDI in a weight ratio of 14.80/0.03/0.17.

Examples 1-4

Adhesive A was coated onto Film 5 and dried to a thickness of 38 micrometers (1.5 mils). Fluoropolymer films were laminated to samples of these adhesives with a hand roller. The formed laminates were aged at 60° C. for 3 days and tested for peel adhesion according to the 180° Peel Adhesion Test. The results are reported in Table 1. The 180° Peel Test for examples reported in Table 1 (below) was measured using the Instron peel tester with a peel rate of 6 inches per minute (15 cm/min).

TABLE 1

| EXAMPLE | FLUOROPOLYMER FILM IN LAMINATE | 180° PEEL TEST, N/cm | FAILURE MODE |
|---|---|---|---|
| 1 | Film 1 | 3.2 | adhesive failure at Film 5 |
| 2 | Film 2 | 4.0 | adhesive failure at Film 5 |
| 3 | Film 3 | 2.8 | adhesive failure at Film 5 |
| 4 | Film 4 | 4.2 | adhesive failure at Film 5 |

Example 5-8

The adhesive solution of Adhesive C was coated onto Film 5 using a Number 12 Mayer rod and dried at 60° C. for about 10 minutes to a thickness of 0.3 mil (8 micrometers). Fluoropolymer films were laminated to samples of these adhesives with a hand roller (hand lamination) or vacuum laminated. Specimens of initially formed laminates were tested for peel adhesion according to the 180° Peel Adhesion Test to give initial peel adhesion values. Specimens of the laminates were also tested after aging at 85° C./85% Relative Humidity for 10 days. The results are reported in Table 2. The 180° Peel Test for examples reported in Table 2 (below) was measured using the Instron peel tester with a peel rate of 6 inches per minute (15 cm/min).

TABLE 2

| EXAMPLE | FLUOROPOLYMER FILM IN LAMINATE | LAMINATION METHOD | 180° PEEL TEST, INITIAL, N/cm | FAILURE MODE | 180° PEEL TEST, AGED, N/cm | FAILURE MODE |
|---|---|---|---|---|---|---|
| 5 | Film 1 | Hand | 2.8 | adhesive failure at Film 5 | 2.0 | adhesive failure at Film 5 |
| 6 | Film 1 | vacuum | 2.4 | mixed mode | 2.1 | adhesive failure at Film 5 |
| 7 | Film 3 | Hand | 2.1 | mixed mode | 1.7 | not measured |
| 8 | Film 3 | vacuum | 1.6 | mixed mode | 1.4 | adhesive failure at Film 5 |

Examples 9-18

The adhesive solution of Adhesive A was dried after coating onto Film 5 using either a Number 12, a Number 22, or a Number 34 Mayer rod. Fluoropolymer films were laminated to samples of these adhesives with a hand roller. Specimens of initially formed laminates were tested for peel adhesion according to the 180° Peel Adhesion Test to give initial peel adhesion values. Specimens of the laminates were also tested after aging at 85° C./85% Relative Humidity for 10 days. The results are reported in Table 3. The 180° Peel Test for examples reported in Table 3 (below) was measured using the Instron peel tester with a peel rate of 6 inches per minute (15 cm/min).

Example 19

The adhesive solution of Adhesive B was coated onto Film 5 and dried at 70° C. in a forced air oven for 5 minutes to provide a dry adhesive film approximately 51 micrometer (2 mils) thick. The adhesive samples were laminated to several fluorine-containing thermoplastic polymeric films with a single pass of a 2-kg hand roller. The formed laminates were aged for 5 days at room temperature and tested for 180° peel adhesion using the IMass peel tester with a platen speed of 0.3 meters/minute according to the 180° Peel Adhesion Test. The results are reported in Table 4.

TABLE 3

| EXAMPLE | FLUOROPOLYMER FILM IN LAMINATE | LAMINATION METHOD | MAYER ROD | 180° PEEL TEST, INITIAL, N/cm | FAILURE MODE | 180° PEEL TEST, AGED, N/cm | FAILURE MODE |
|---|---|---|---|---|---|---|---|
| 9 | Film 1 | hand | 12 | 3.4 | adhesive failure at Film 5 | 2.2 | adhesive failure at Film 5 |
| 10 | Film 1 | vacuum | 12 | 2.3 | adhesive failure at Film 5 | 2.3 | adhesive failure at Film 5 |
| 11 | Film 1 | hand | 22 | 3.4 | adhesive failure at Film 5 | 2.9 | adhesive failure at Film 5 |
| 12 | Film 1 | vacuum | 22 | 2.1 | adhesive failure at Film 5 | 1.8 | adhesive failure at Film 5 |
| 13 | Film 1 | hand | 34 | 4.2 | adhesive failure at Film 5 | 2.5 | adhesive failure at Film 5 |
| 14 | Film 1 | vacuum | 34 | 3.0 | adhesive failure at Film 5 | 3.2 | adhesive failure at Film 5 |
| 15 | Film 11 | hand | 34 | 3.2 | adhesive failure at Film 5 | 1.5 | adhesive failure at Film 5 |
| 16 | Film 11 | vacuum | 34 | 3.0 | adhesive failure at Film 5 | 3.1 | adhesive failure at Film 5 |
| 17 | Film 3 | hand | 34 | 2.7 | mixed mode | 1.7 | adhesive failure at Film 3 |
| 18 | Film 3 | vacuum | 34 | 3.3 | mixed mode | not measured | not measured |

Examples 20 and 21

Examples 20 and 21 were prepared and tested using the same procedure of Example 19, with the exceptions that the adhesive of Example 20 was Adhesive D, and the adhesive of Example 21 was Adhesive E. Results are reported in Table 4 (below).

TABLE 4

| EXAM-PLE | FLUOROPOLYMER FILM IN LAMINATE | 180° PEEL ADHESION TEST, N/cm | FAILURE MODE |
|---|---|---|---|
| 19 | Film 1 | 7.2 | some adhesive picking from Film 5 backing |
|  | Film 3 | 3.7 | clean peel |
|  | Film 6 | 8.0 | some adhesive picking from Film 5 backing |
| 20 | Film 1 | 6.3 | some adhesive picking from Film 5 backing |
|  | Film 3 | 5.3 | some adhesive picking from Film 5 backing |
|  | Film 6 | 7.6 | some adhesive picking from Film 5 backing |
| 21 | Film 1 | 2.6 | clean peel |
|  | Film 3 | 2.8 | some adhesive picking from Film 5 backing |
|  | Film 6 | 5.7 | clean peel |

In Table 4, the term "picking" refers to adhesive failure at a substrate that leaves small pieces of adhesive stuck to the substrate

Example 22

The adhesive solution of Adhesive F was coated onto FILM 5 and dried to a thickness of 64 micrometers (2.5 mils). Fluoropolymer films of Film 7 were laminated to samples of these adhesives with a hand roller. The formed laminates were aged at 60° C. for 3 days and tested for 180° peel adhesion using the IMass peel tester with a platen speed of 2.5 meters/minute (100 inches/minute) according to the 180° Peel Adhesion Test. Results are reported in Table 5.

Example 23

The adhesive solution of Adhesive G was coated onto Film 5 and dried to a thickness of (2.5 mil). Fluoropolymer films of Film 7 were laminated to samples of these adhesives with a hand roller. The formed laminates were aged at 60° C. for 3 days and tested for 180° peel adhesion using the IMass peel tester with a platen speed of 2.5 meters/minute (100 inches/minute) according to the 180° Peel Adhesion Test. Results are reported in Table 5.

Example 24

The adhesive solution of Adhesive H was coated onto Film 5 and dried to a thickness of (2.5 mil). Fluoropolymer films of Film 7 were laminated to samples of these adhesives with a hand roller. The formed laminates were aged at 60° C. for 3 days and tested for 180° peel adhesion using the IMass peel tester with a platen speed of 2.5 meters/minute (100 inches/minute) according to the 180° Peel Adhesion Test. Results are reported in Table 5 (below).

TABLE 5

| EXAMPLE | 180° PEEL TEST, N/cm | FAILURE MODE |
|---|---|---|
| 22 | 4.1 | adhesive failure at Film 5 and some cohesive |
| 23 | 4.1 | adhesive failure at Film 5 |
| 24 | 3.1 | adhesive failure at Film 5 |

Examples 25-64

A series of 3 layer laminates (substrate/adhesive/fluoropolymer film) were prepared using Adhesive I or Adhesive B and differing substrates (either film substrates such as Film 5, Film 12 or Film 13 or solid substrates such as Glass or PMMA) and fluoropolymer films as shown in Table 6. For each sample, the adhesive solution was coated onto the substrate and dried at 70° C. in a forced air oven for 5 minutes to provide a dry adhesive film approximately 51 micrometers (2 mils) thick. The adhesive samples thus prepared were laminated to fluoropolymer films with a single pass of a 2-kg hand roller. The formed laminates were aged for 5 days at room temperature and tested for 180° peel adhesion using the IMass peel tester with a platen speed of 2.5 meters/minute (100 inches/minute) according to the test method outlined above. Results are reported in Table 6 (below).

TABLE 6

| EXAMPLE | LAMINATE (SUBSTRATE/ ADHESIVE/ FLUOROPOLYMER FILM) | 180° PEEL TEST, N/cm | FAILURE MODE |
|---|---|---|---|
| 25 | Film 13/Adhesive I/Film 3 | 3.90 | adhesive failure at Film 13 |
| 26 | Film 12/Adhesive I/Film 3 | 4.00 | adhesive failure at Film 12 |
| 27 | Film 5/Adhesive I/Film 3 | 4.16 | adhesive failure at Film 5 |
| 28 | Glass/Adhesive I/Film 3 | 5.16 | adhesive failure at Glass |
| 29 | PMMA/Adhesive I/Film 3 | 4.34 | adhesive failure at PMMA |
| 30 | Film 13/Adhesive I/Film 1 | 4.00 | adhesive failure at Film 13 |
| 31 | Film 12/Adhesive I/Film 1 | 4.14 | adhesive failure at Film 12 |
| 32 | Film 5/Adhesive I/Film 1 | 4.13 | adhesive failure at Film 5 |
| 33 | Glass/Adhesive I/Film 1 | 4.26 | adhesive failure at Glass |
| 34 | PMMA/Adhesive I/Film 1 | 4.14 | adhesive failure at PMMA |
| 35 | Film 13/Adhesive I/Film 2 | 9.10 | adhesive failure at Film 13 |
| 36 | Film 12/Adhesive I/Film 2 | 9.54 | adhesive failure at Film 12 |
| 37 | Film 5/Adhesive I/Film 2 | 9.66 | adhesive failure at Film 5 |
| 38 | Glass/Adhesive I/Film 2 | 10.87 | adhesive failure at Glass |
| 39 | PMMA/Adhesive I/Film 2 | 9.90 | adhesive failure at PMMA |
| 40 | Film 13/Adhesive I/Film 11 | 9.95 | adhesive failure at Film 13 |
| 41 | Film 12/Adhesive I/Film 11 | 9.81 | adhesive failure at Film 12 |

TABLE 6-continued

| EXAMPLE | LAMINATE (SUBSTRATE/ ADHESIVE/ FLUOROPOLYMER FILM) | 180° PEEL TEST, N/cm | FAILURE MODE |
|---|---|---|---|
| 42 | Film 5/Adhesive I/ Film 11 | 9.92 | adhesive failure at Film 5 |
| 43 | Glass/Adhesive I/ Film 11 | 7.72 | adhesive failure at Glass |
| 44 | PMMA/Adhesive I/ Film 11 | 6.95 | adhesive failure at PMMA |
| 45 | Film 13/Adhesive B/ Film 1 | 7.68 | cohesive failure |
| 46 | Film 5/Adhesive B/ Film 1 | 7.93 | cohesive failure |
| 47 | Film 12/Adhesive B/ Film 1 | 7.54 | cohesive failure |
| 48 | Glass/Adhesive B/ Film 1 | 8.37 | cohesive failure |
| 49 | PMMA/Adhesive B/ Film 1 | 6.96 | cohesive failure |
| 50 | Film 13/Adhesive B/ Film 11 | 11.61 | cohesive failure |
| 51 | Film 5/Adhesive B/ Film 11 | 13.93 | cohesive failure |
| 52 | Film 12/Adhesive B/ Film 11 | 14.65 | adhesive failure at Film 12 |
| 53 | Glass/Adhesive B/ Film 11 | 14.63 | adhesive failure at Glass |
| 54 | PMMA/Adhesive B/ Film 11 | 13.00 | adhesive failure at PMMA |
| 55 | Film 13/Adhesive B/ Film 2 | 8.58 | cohesive failure |
| 56 | Film 5/Adhesive B/ Film 2 | 10.66 | adhesive failure at Film 5 |
| 57 | Film 12/Adhesive B/ Film 2 | 11.47 | adhesive failure at Film 12 |
| 58 | Glass/Adhesive B/ Film 2 | 10.63 | adhesive failure at Glass |
| 59 | PMMA/Adhesive B/ Film 2 | 11.00 | adhesive failure at PMMA |
| 60 | Film 13/Adhesive B/ Film 3 | 8.29 | cohesive failure |
| 61 | Film 5/Adhesive B/ Film 3 | 9.78 | cohesive failure |
| 62 | Film 12/Adhesive B/ Film 3 | 10.25 | cohesive failure |
| 63 | Glass/Adhesive B/ Film 3 | 9.19 | cohesive failure |
| 64 | PMMA/Adhesive B/ Film 3 | 8.98 | cohesive failure |

Examples 65-68

A series of 3 layer laminates (substrate/adhesive/fluoropolymer film) were prepared using Adhesive J and differing substrates and fluoropolymer films as shown in Table 7. For each sample, Adhesive solution was coated onto the substrate and dried at 70° C. in a forced air over for 5 minutes to provide a dry adhesive film approximately 51 micrometers (2 mils) thick adhesive samples thus prepared were laminated (with a single pass of a 2-kg hand roller) to fluoropolymer films and the formed laminates were aged overnight, and then tested for 180° peel adhesion using an Instron peel tester at a peel rate of 4 inches per minute (10 cm/min) according to the 180° Peel Test. Results are reported in Table 7 (below).

TABLE 7

| EXAMPLE | LAMINATE (SUBSTRATE/ ADHESIVE/ FLUOROPOLYMER FILM) | 180° PEEL TEST, oz/in (N/cm) | FAILURE MODE |
|---|---|---|---|
| 65 | glass/Adhesive J/ Film 9 | 1.3 (15) | cohesive failure |
| 66 | Film 14/Adhesive J/ Film 9 | 1.4 (16) | 90-95% of adhesive remained on Film 9 |
| 67 | glass/Adhesive J/ Film 10 | 0.8 (9.0) | cohesive failure |
| 68 | Film 14/Adhesive J/ Film 10 | 0.9 (10) | cohesive failure |

Various modifications and alterations of this invention may be made by those skilled in the art without departing from the scope and spirit of this invention, and it should be understood that this invention is not to be unduly limited to the illustrative embodiments set forth herein.

What is claimed is:

1. An adhesive article comprising:
a fluorothermoplastic film having a interior portion and a major surface; and
a pressure sensitive adhesive layer adhered to at least a portion of the major surface, wherein the pressure sensitive adhesive comprises a silicone polyurea block copolymer and an MQ tackifying resin, and wherein the silicone polyurea block copolymer comprises n blocks represented by the formula and m blocks represented by the formula wherein
each R is methyl;
each Z is —$CH_2C_6H_4C(CH_3)_2C_6H_4CH_2$—;
each Y is —$CH_2CH_2CH_2$—;
each D is H:
each B is —$CH_2CH_2CH_2CH(CH_3)$—;
p is an integer number that is at least 10;
n is an integer that is at least 1; and
m is an integer in a range of from at least 1 up to and including 1,000, and wherein the ratio of n to m is in a range of from about 1:10 to about 10:1.

2. A method of making an adhesive article, the method comprising adhering a pressure sensitive adhesive layer to at least a portion of a major surface of a fluorothermoplastic film, wherein the pressure sensitive adhesive comprises a silicone polyurea block copolymer and an MQ tackifying resin, wherein the pressure sensitive adhesive comprises a silicone polyurea block copolymer and an MQ tackifying resin, and wherein the silicone polyurea block copolymer comprises n blocks represented by the formula and m blocks represented by the formula wherein
  each R is methyl;
  each Z is —CH$_2$C$_6$H$_4$C(CH$_3$)$_2$C$_6$H$_4$CH$_2$—;
  each Y is —CH$_2$CH$_2$CH$_2$—;
  each D is H:
  each B is —CH$_2$CH$_2$CH$_2$CH(CH$_3$)—;
  p is an integer number that is at least 10;
  n is an integer that is at least 1; and
  m is an integer in a range of from at least 1 up to and including 1,000, and wherein the ratio of n to m is in a range of from about 1:10 to about 10:1.

* * * * *

UNITED STATES PATENT AND TRADEMARK OFFICE
CERTIFICATE OF CORRECTION

PATENT NO. : 7,560,166 B2  Page 1 of 1
APPLICATION NO. : 11/275355
DATED : July 14, 2009
INVENTOR(S) : George G. I. Moore It is certified that error appears in the above-identified patent and that said Letters Patent is hereby corrected as shown below:

Column 2
Line 21, delete "thereof," and insert -- thereof; -- in place thereof.
Line 31, delete "thereof," and insert -- thereof; -- in place thereof.

Column 3
Line 13, delete "thereof," and insert -- thereof; -- in place thereof.
Line 22, delete "thereof," and insert -- thereof; -- in place thereof.

Column 12
Line 47, delete ""HTE15 10"." and insert -- "HTE1510". -- in place thereof.

Column 19
Line 58, delete "Adhesive" and insert -- the adhesive -- in place thereof.
Line 59, delete "over" and insert -- oven -- in place thereof.
Line 61, delete "thick adhesive" and insert -- thick. The adhesive -- in place thereof.

Column 20
Line 52, Claim 1, delete "H:" and insert -- H; -- in place thereof.

Column 22
Line 6, Claim 2, delete "H:" and insert -- H; -- in place thereof.

Signed and Sealed this

Sixth Day of October, 2009

David J. Kappos
*Director of the United States Patent and Trademark Office*